United States Patent Office 3,171,835
Patented Mar. 2, 1965

3,171,835
4,4,6,16-TETRAALKYL-5-PREGNENE STEROIDS AND PROCESS OF PREPARATION
Susumu Nakanishi, Hopkins, Minn., assignor to General Mills, Inc., a corporation of Delaware
No Drawing. Filed Dec. 18, 1962, Ser. No. 245,380
24 Claims. (Cl. 260—239.5)

This invention relates to 4,4-dialkylated steroid compounds and in particular to the 4,4-dialkylation of 6,16-dialkyl steroids. More specifically, the invention therefore relates to the 4,4,6,16-tetraalkyl-5-pregnene steroid compounds and their method of preparation.

These 4,4,6,16-tetramethyl-5-pregnene compounds are progestationally active and thus are of clinical value for the prevention of habitual or threatened abortion, the treatment of dysmennorhoea, pre-menstrual tension, as ovulation-suppressing agents and other sex cyclic regulatory purposes.

In addition to their usefulness in themselves as highly active progestational hormones, these 4,4,6,16-tetraalkyl compounds are valuable intermediates in the preparation of other steroids. The compounds are of great value for the chemical and/or microbiological conversion to the anti-inflammatory corticoid hormones, for example, by introduction of oxygen into position 11 of the molecule by fermentation with known microorganisms to provide an 11-hydroxy compound in which the 11-hydroxy group may be further oxidized chemically to a ketone group.

Accordingly, the tetraalkyl compounds are active progestational agents in themselves and further useful as valuable intermediates to research chemists for conversion to other progestogens or corticoid hormones.

It is therefore an object of this invention to provide novel progestationally active steroids of the formula

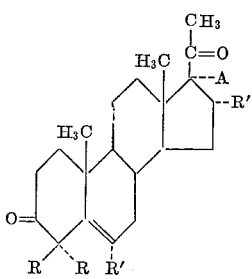

where R and R' are alkyl groups having from 1 to 8 carbon atoms and where A is H, OH or

and R'' is an alkyl, cycloalkyl, aralkyl or alkoxyaralkyl group in which the alkyl group generally has from 1 to 12 carbon atoms and the aryl group is generally phenyl.

It is also an object of this invention to provide a process of preparation of such products.

It is further an object of this invention to provide novel intermediates in the preparation of such products.

Briefly, the products of the present invention may be prepared alternately (1) by forming the 3-enamine derivative of the corresponding 6,16-dialkyl progesterone compound followed by alkylation thereof with an alkyl halide or (2) by direct alkylation of an alcoholic solution of the corresponding 6,16-dialkyl progesterone compound with an alkyl halide.

The starting materials for the present invention are the progesterone compounds having the formulae

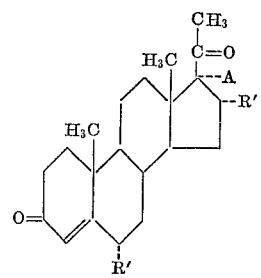

and

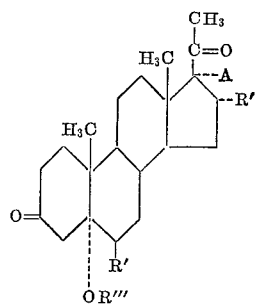

where R' and A are as previously defined and R''' is H or

where Alk is an alkyl group having from 1 to 12 carbon atoms.

These starting materials may be prepared as described in Belgian Patents 608,652 and 613,688 and commonly assigned copending U.S. application Serial No. 122,092 by R. P. Graber and M. B. Meyers, filed July 6, 1961, now Patent No. 3,123,660, the disclosures of which are hereby incorporated by reference.

The preferred method of preparation of the tetraalkyl products of the present invention is via the intermediate 3-enamine product. According to this method, a ketone group at the 3-position of a steroid is converted to an enamine derivative by reaction with a secondary amine in an organic solvent.

With either of the two starting materials, the 3-enamine product formed can be represented by the following formula

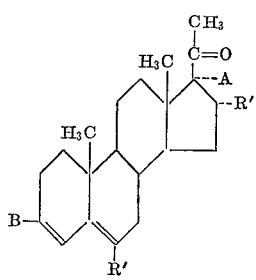

where B is selected from the group consisting of

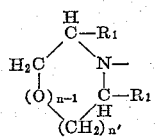

and

where $n$ is a whole number from 1 to 2 and $n'$ is 1 when $n$ is 2 and $n'$ is a whole number from 1 to 3 when $n$ is 1, $R_1$ is an alkyl group having from 1 to 5 carbon atoms and $R_2$ and $R_3$ are straight or branched chain aliphatic hydrocarbon groups each having from 1 to 12 carbon atoms and R' and A are as previously defined.

Conditions for the formation of the enamines include a reaction temperature between approximately 25 to 150° C. and preferably between 25 to 80° C. The reaction temperature is, of course, always below the decomposition temperatures of the ultimate reaction product, i.e. the enamine. The reaction time varies according to the reactivity of the amine and the temperature of reaction. Generally a reaction period of from 2 minutes to several days is employed. The preferred amount of amine employed is in the ratio of 1.1 to 2 moles of amine to one mole of steroid, although a large molar equivalent excess of amines can be employed in this reaction.

Any organic solvent which is inert under the conditions of reaction may generally be employed. While the lower alkyl alcohols (1 to 4 carbon atoms) are preferred as the organic solvent, such as methanol, ethanol and the like, among the other organic solvents which may be employed are benzene, toluene, xylene, chlorobenzene, pentane, hexane, methylene chloride, carbon tetrachloride, tertiary butyl alcohol, tetrahydrofuran and dioxane.

While pyrollidine is the preferred secondary amine for formation of the enamine, other secondary amines may be employed. Illustrative thereof are dialkylamines, either substituted or unsubstituted; cycloalkyl amines, cyclic amines, aralkyl amines and aralkylalkylamines such as morpholine, piperidine, C-alkyl substituted pyrrolidine, e.g. 2,4-dimethyl-pyrrolidine, 3-isopropylpyrrolidine and 3,3-dimethylpyrrolidine.

After isolation, the enamine is then alkylated to provide the desired 4,4-dialkyl products These are prepared by reacting the 3-enamine compound in an inert organic solvent with an alkyl halide and isolating the 4,4-dialkyl product formed. While the reaction is generally conducted at reflux temperatures of the reaction mixture and always below the decomposition temperature of the ultimate reaction product, i.e. the 4,4-dialkyl product, reaction temperatures between 25° to 150° C. may be employed, preferably between 25° to 80° C Reaction time varies dependent on the reactivity of the alkylating agent and the temperature employed. Generally from 10 minutes to 6 days are required. The alkylating agent is employed in an amount of from 2 to 7 moles per mole of enamine compound employed. Generally 2 to 3 molar excess alkylating agent is employed.

The alkylating agents employed are the alkyl halides having the formula RX where R is an alkyl group having from 1 to 8 carbon atoms and X is a halogen. Generally R is methyl; however, ethyl, propyl, isopropyl, butyl, isobutyl and octyl halides may be employed. The iodide is preferred; however, the other halides such as chloride and bromide may conveniently be employed.

Any inert inorganic solvent may be employed. However, the lower alkyl alcohols (1 to 4 carbon atoms) are preferred such as methanol, ethanol, isopropanol, t-butanol and the like. Other solvents which may be employed, however, include the aromatic hydrocarbons such as benzene, toluene, xylene, chlorobenzene, tetrahydrofuran and an alkylene glycol-dialkyl ether mixture such as ethylene glycol-dimethyl ether, as well as pentane, hexane, methylene chloride and dioxane.

During the alkylation, an inorganic base such as potassium carbonate, sodium carbonate and the like may be employed. However, to avoid the isomerization of side chain or D-homoannulation, brief treatment with a weak base is recommended.

As indicated previously, the compounds may also be prepared by direct alkylation with an alkyl halide. The alkyl halides which may be employed are the same as previously indicated for alkylation of the enamine. The preferred solvent for this direct alkylation is t-butanol. However, other solvents may be employed such as benzene, tetrahydrofuran and dimethyl formamide.

Sodium and potassium salts of tertiary alcohols are efficient bases for the alkylation of $\alpha,\beta$-unsaturated ketones in the $\alpha$-position. In ring A unsubstituted $\Delta^4$-3-keto-steroids, the conjugated anion is formed with potassium t-butoxide in t-butyl alcohol. At this point two competing reactions (1) alkylation at C–4 and (2) formation of 4-methyl-$\Delta^4$-3-ketone by protonation at C–6. However, at room temperature and in the presence of excess alkyl halide faster reaction of (1) leads to the 4,4-dimethyl compound. Therefore, the preferred method of preparation of the tetraalkyl product is employment of 5 to 10 equivalent moles excess methyl iodide and at room temperature reaction, (15°–30° C.), and the treatment with potassium t-butoxide in BuOH preferably before the addition of alkyl halide.

The following examples will serve to illustrate the invention. To avoid an undue number of examples, reference is made only to the methyl products, the 17-hydroxy and 17-acetate esters. The invention is not to be limited thereto and it is hereby understood that the invention is applicable to other alkyl groups and other esters as previously indicated.

EXAMPLE I

*6,16α-dimethyl-3,5-pregnadiene-20-one-3-(N-pyrrolidyl)-enamine*

6α,16α-dimethylprogesterone, 3.42 g. (10 mmoles) was dissolved in 20 ml. of methanol containing a drop of pyrrolidine and the solution was heated to boiling. Then 1.5 ml. of pyrrolidine was introduced and the mixture heated for 5 minutes. Upon cooling, crystals formed which were filtered, washed with cold methanol and dried in vacuo for 18 hours. There was obtained 3.665 g. having a melting point (M.P.) of 144–6° C. (decompn.); $[\alpha]_D^{25}$ −25° (c.=1, $CHCl_3$); $\lambda_{KBr}$ 5.87, 6.11, 6.23$\mu$.

*Analysis.*—Calcd. for $C_{27}H_{41}NO$: C=81.97; H=10.45; N=3.54. Found: C=81.25; H=10.22; N=3.14.

EXAMPLE II

*4,4,6,16α-tetramethylpregna-5-one-3,20-dione*

6α,16α-dimethylprogesterone - 3 - (N-pyrrolidyl) - enamine, 2.85 g. in 25-ml. of absolute methanol and 50 ml. of methyl iodide, was refluxed for 40 hours.

Then the solution was concentrated by distillation to remove excess methyl iodide (150 ml. was distilled off). There was then added 10 ml. of 10% sodium hydroxide aqueous solution and the mixture was heated for 10 minutes followed by concentration to about 50 ml. during a period of 20 minutes to remove most of methanol. Water was then added. The crystals which formed were filtered, washed well with water to neutral and dried to give 2.15 g. having a M.P. of 78–84° C.

Florisil chromatography and methylene chloride elutions gave 570 mg. of crude 4,4,6α,16α-tetramethyl-5-pregnene-3,20-dione with a M.P. of 112–115° C., which was recrystallized from methanol to give an analytical sample of 381 mg. having a M.P. of 114–115° C., [α]$_D^{25°}$ +10.0° (c.=1, CHCl₃)

$$\lambda_{KBr}^{C=O} \text{ 5.84, 5.87}\mu$$

and no ultraviolet absorption.

*Analysis.*—Calcd. for C₂₅H₃₈O₂: C=81.03; H=10.34. Found: C=80.12; H=10.03.

EXAMPLE III

*6,16α-dimethyl-17α-hydroxy-3,5-pregnadiene-20-one-3-(N-pyrrolidyl)-enamine*

A suspension of 6β,16α-dimethyl-5α,17α-dihydroxypregnan-3,20-dione (5 g.) in 30 ml. of methanol was heated to boiling. There was then added 1 ml. of pyrrolidine and the mixture was boiled for 2 minutes.

Upon cooling the homogeneous solution, crystals were formed and filtered to give 5.326 g. of a product having a M.P. of 151–160° C.(decompn.).

Recrystallization from absolute methanol furnished the pure enamine, 3.102 g., M.P. 188–190° (decompn.), [α]$_D^{25°}$ −148° (c.=1, CHCl₃); λ$_{KBr}$ 2.86, 5.89, 6.08, 6.22$\mu$. Calcd. for C₂₇H₄₁NO₂: C=78.78; H=10.04; N=3.40. Found: C=78.24; H=9.95; N=3.50.

EXAMPLE IV

*6,16α-dimethyl-17α-hydroxy-3,5-pregnadiene-20-one-3-(N-pyrrolidyl)-enamine*

In the same manner as Example III a suspension of 6β,16α-dimethyl-17α-hydroxy - 5α - acetoxypregnan-3,20-dione, 2 g., was boiled for 2 minutes. The homogeneous solution was cooled, which formed a precipitate which was filtered. There was obtained 2.18 g., M.P. 152–160° C. (decompn.). Recrystallization from absolute methanol furnished the first crop of 1.058 g., M.P. 183–6° C. (decompn.); [α]$_D^{25°}$ −148° (c.=1, CHCl₃); λ$_{KBr}$ 2.86, 5.89, 6.08, 6.22$\mu$.

EXAMPLE V

*4,4,6,16α-tetramethyl-17α-hydroxy-5-pregnene-3,20-dione*

6,16α-dimethyl - 17α - hydroxy-3,5-pregnadiene-20-one-3-(N-pyrrolidyl)-enamine, 3 g., in 250 ml. of absolute methanol and 50 ml. of methyl iodide was heated at reflux under nitrogen atmosphere for 64 hours. The excess methyl iodide was distilled off and the methanolic solution was concentrated to about 100 ml. After pouring into ice water and acidifying with concentrated hydrochloric acid to a pH of 2, the aqueous suspension was left standing at room temperature for one and one-half hours. After extraction with methylene chloride, washing and drying, there was obtained 2.51 g., M.P. 135–148° C., of a crude mixture of 4,4,6,16α-tetramethyl-17α-hydroxy-5-pregnene-3,20-dione and 4,6α,16α-trimethyl-17α-hydroxyprogesterone, λ$_{KBr}$ 2.98, 5.88, 6.04 and 6.18$\mu$.

EXAMPLE VI

The crude mixture obtained in Example V, 2.5 g., was dissolved in 20 ml. of glacial acetic acid and 4 ml. of acetic anhydride. There was then added 500 mg. of p-toluenesulfonic acid monohydrate and the mixture was kept at room temperature overnight.

The mixture was diluted with water, extracted with methylene chloride, and washed in sequence with (*a*) water, (*b*) 5% sodium bicarbonate solution, and (*c*) salt water. This was followed by drying over magnesium sulfate, filtration and evaporation to give 2.875 g., M.P. 90–110° C.

The product, 2.8 g., was put on 100 g. of a florisil (60/100 mesh) column prepared in n-hexane. Elutions with 10% ether in methylene chloride gave 478 mg., M.P. 96–107° C. Recrystallization from aqueous methanol gave the first crop of 320 mg., M.P. 96.7°, which showed a trace of ultraviolet absorption. There was then purified 360 mg. using 30 g. of silica gel column prepared in benzene. The elution with 5% ethyl acetate in benzene gave 184 mg., M.P. 150–155° C. Three recrystallizations from aqueous methanol furnished pure 4,4,6,16α-tetramethyl-17α-acetoxy-5-pregnene-3,20-dione, 92 mg., M.P. 154–155.5° C. λ$_{KBr}$ 5.75, 5.85, 8.01$\mu$.

*Analysis.*—Calcd. for C₂₇H₄₀O₄: C=75.66; H=9.41. Found: C=75.62; H=9.39.

EXAMPLE VII 6,16α-dimethyl-17α-hydroxy - 3,5 - pregnadiene-20-one-3-(N-pyrrolidyl)-enamine, 900 mg., in 150 ml. of absolute methanol and 50 ml. of methyl iodide, was refluxed under nitrogen atmosphere for 64 hours. The excess methyl iodide was distilled off (about 120 ml. was collected). There was then added 20 ml. of 5% aqueous sodium hydroxide and the mixture was heated under reflux for 10 minutes. Upon dilution with water a crystalline material formed which was filtered, washed well with water and dried to give 890 mg. of the crude mixture, identical with the compound obtained in Example V, M.P. 130–144° C.

The crude mixture was dissolved in 10 ml. of acetic acid and 2 ml. of acetic anhydride. There was then added p-toluene-sulfonic acid monohydrate and the mixture was kept at room temperature overnight. Upon dilution with water and extraction with ether, the product was washed, dried and evaporated to give 800 mg., M.P. 90–104° C. Further purification by florisil chromatography gave 4,4,6,16α-tetramethyl-5-pregnene-3,20-dione.

EXAMPLE VIII 6,16α-dimethyl-17α-hydroxy - 3,5 - pregnadiene-20-one-3-(N-pyrrolidyl)-enamine, 8.9 g. in 250 ml. of absolute methanol and 50 ml. of methyl iodide was refluxed under nitrogen atmosphere for five days. There was then adaded 500 mg. of anhydrous potassium carbonate to the boiling solution and the mixture was then refluxed for 3 minutes, cooled to room temperature and left standing at room temperature overnight.

Potassium carbonate was filtered and excess methyl iodide was evaporated by rotary evaporator (bath temp. 30–40° C.). The methanolic solution was concentrated to about half, diluted with ice-water, acidified with concentrated hydrochloric acid to pH 2 and was kept at room temperature for 2 hours to hydrolyze the enamine. The crystals which formed were filtered, washed well with water and dried to give 10.67 g. of crude mixture.

The crude mixture was dissolved in 100 ml. of acetic acid and 20 ml. of acetic anhydride. There was then added 2.5 g. of p-toluene-sulfonic acid monohydrate and the mixture was kept at room temperature overnight.

Upon dilution with water, the crystals which formed were filtered, washed well with water and dried to give 5.059 g., M.P. 108–110° C. Further purification by silica gel chromatography gave 4,4,6,16α-tetramethyl-5-pregnene-3,20-dione.

EXAMPLE IX

Under nitrogen atmosphere, 17α-acetoxy-6α,16α-dimethylprogesterone, 1 g., was added to the solution of tert.-butanol (20 ml.) containing 400 mg. of potassium (potassium was dissolved in t-butanol completely before the addition). The steroid was then dissolved by stirring. Upon introducing 5 ml. of methyl iodide at room temperature, the mixture was stirred for 10 minutes and then the stopped flask under nitrogen was left standing at room temperature for 4 hours. Water was then added and t-butanol was removed in vacuo at room temperature for 5 minutes. The crystalline which formed was filtered, well washed with water and dried to give a crude mixture, 1.112 g., M.P. 107–156°. The infrared mass spectrum as well as gas chromatography indicated a small amount of 4,4-dimethyl- and 4-monomethyl product present. No D-homoannulation was observed. Recrystallization of the crude product from n-hexane-acetone recovered 364 mg. of the starting 17α-acetoxy-6α,16α-dimethyl progesterone, while the purification of mother liquor by repeated silica gel chromatography gave 4,4-dimethylated compound.

Following the procedure set forth in Examples I, II and VIII employing starting materials having other alkyl groups and employing the corresponding alkylating agent, the following compounds may be prepared:

4,4-dimethyl-6α,16α-diethyl-5-pregnene-3,20-dione.
4,4-dimethyl-6α,16α-dioctyl-5-pregnene-3,20-dione.
4,4-dimethyl-6-ethyl-16α-octyl-5-pregnene-3,20-dione.
4,4-dimethyl-6-octyl-16α-methyl-5-pregnene-3,20-dione.
4,4-diethyl-6,16α-dimethyl-5-pregnene-3,20-dione.
4,4-dioctyl-6,16α-dimethyl-5-pregnene-3,20-dione.
4,4-dibutyl-6-methyl-16α-ethyl-5-pregnene-3,20-dione.
4,4,6,16α-tetraethyl-5-pregnene-3,20-dione.
4,4,6,16α-tetraoctyl-5-pregnene-3,20-dione.

Following the procedures set forth in Examples III, IV, and V, starting with the corresponding 17-hydroxy compound and employing the corresponding alkylating agents, the 17-hydroxy compounds corresponding to those set forth above may be prepared. These 17-hydroxy compounds may then be acylated in the manner set forth in Examples VI and VII to provide the corresponding 17-acylated products.

Illustrative of these 17-hydroxy and 17-acyloxy products which may be prepared are the following:

4,4,6,16α-tetramethyl-17α-ol-5-pregnene-3,20-dione-17-cyclopropionate.
4,4,6,16α-tetramethyl-17α-ol-5-pregnene-3,20-dione-17-phenylpropionate.
4,4,6,16α-tetramethyl-17α-ol-5-pregnene-3,20-dione-17-p-hexoxyphenyl propionate.
4,4,6,16α-tetraethyl-16α-ol-5-pregnene-3,20-dione-17-p-dodecoxyphenyl propionate.
4,4,6,16α-tetraethyl-17α-hydroxy-5-pregnene-3,20-dione.
4,4-dimethyl-6,16-diethyl-17α-hydroxy-5-pregnene-3,20-dione and the corresponding 17-acetate or 17-p-dodecoxyphenylpropionate.
4,4-dimethyl-6,16α-dioctyl-17α-hydroxy-5-pregnene-3,20-dione and the corresponding 17-acetate, 17-propionate or 17-phenylpropionate.
4,4-dimethyl-6-ethyl-16α-octyl-17α-hydroxy-5-pregnene and the corresponding 17-acetate or 17-cyclophenyl propionate.
4,4-dimethyl-6-octyl-16α-methyl-17α-hydroxy-5-pregnene-3,20-dione and the corresponding 17-acetate or 17-p-propoxyphenylpropionate.
4,4-diethyl-6,16α-dimethyl-17α-hydroxy-5-pregnane-3,20-dione and the corresponding 17-acetate or 17-propionate.

As previously indicated, the final products of the present invention are oral progestational agents. For example, in an oral Clauberg test on 4,4,6,16α-tetramethyl-17α-acetoxy-progesterone was found to be about 52 times as active as ethisterone at 0.075 mg. total dose level. The following are results of oral Clauberg tests against an ethisterone standard at a 10 mg. level:

| Compound | Level, mg. | Response |
|---|---|---|
| 4,4,6,16α-tetramethyl-5-pregnene-3,20-dione | 5 | +0.03 |
| | 10 | +0.03 |
| | 20 | +0.08 |
| 4,4,6,16α-tetramethyl-17α-acetoxy-5-pregnene-3,20-dione | 0.075 | +0.08 |
| | 0.75 | +1.5 |
| | 7.5 | +3.8 |

The embodiments of the invention in which an exclusive property or privilege is claimed are defined as follows:

1. A process of preparing compounds of the formula

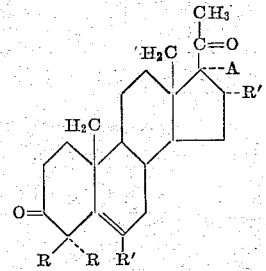

where R and R' are alkyl groups having from 1 to 8 carbon atoms, A is selected from the group consisting of H, OH and

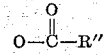

where R'' is selected from the group consisting of alkyl, cycloalkyl, aralkyl and alkoxyaralkyl groups in which the alkyl group has from 1 to 12 carbon atoms and the aryl group is phenyl comprising treating a compound of the formula

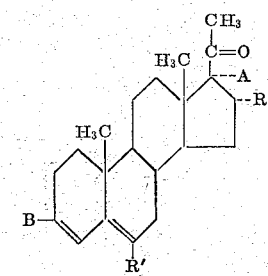

where R' and A are as previously defined and B is selected from the group consisting of

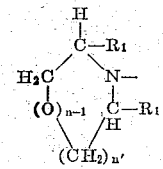

and

where $n$ is a whole number from 1 to 2 and $n'$ is 1 when $n$ is 2 and $n'$ is a whole number from 1 to 3 when $n$ is 1, $R_1$ is an alkyl group having from 1 to 5 carbon atoms and $R_2$ and $R_3$ are aliphatic hydrocarbon groups having from 1 to 12 carbon atoms with an alkyl halide of the formula RX where R is an alkyl group having from 1 to 8 carbon atoms and X is a halogen.

2. A process as defined in claim 1 wherein A is OH and further comprising subsequently treating the product

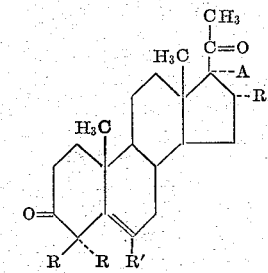

where R and R' are alkyl groups having from 1 to 8 carbon atoms, with an acylating agent thereby converting the 17-OH group to

where R'' is selected from the group consisting of alkyl, cycloalkyl, aralkyl and alkoxyaralkyl groups in which the alkyl group has from 1 to 12 carbon atoms and the aryl group is phenyl.

3. A process as defined in claim 1 in which R is methyl.
4. A process as defined in claim 1 in which R' is methyl.
5. A process as defined in claim 1 in which RX is methyl iodide.
6. A steroid compound having the formula

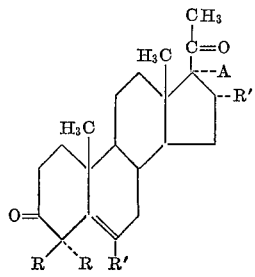

where R and R' are alkyl groups having from 1 to 8 carbon atoms, A is selected from the group consisting of H, OH and

where R'' is selected from the group consisting of alkyl, cycloalkyl, aralkyl and alkoxyaralkyl groups in which the alkyl group has from 1 to 12 carbon atoms and the aryl group is phenyl.

7. A compound as defined in claim 6 in which R is methyl.
8. A compound as defined in claim 6 in which R' is methyl.
9. A compound as defined in claim 6 in which A is H.
10. A compound as defined in claim 6 in which A is OH.
11. A compound as defined in claim 6 in which A is

12. A compound as defined in claim 11 in which R'' is methyl.
13. 4,4,6,16α-tetramethyl-5-pregnene-3,20-dione.
14. 4,4,6,16α - tetramethyl - 17α - hydroxy-5-pregnene-3,20-dione.
15. 4,4,6,16α-tetramethyl-17α - acetoxy - 5 - pregnene-3,20-dione.

16. A steroid compound having the formula

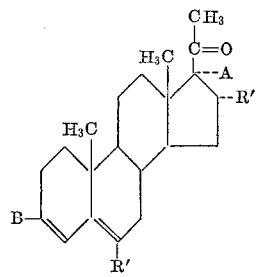

where R' is an alkyl group having from 1 to 8 carbon atoms and A is selected from the group consisting of H, OH and

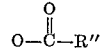

where R'' is selected from the group consisting of alkyl, cycloalkyl, aralkyl and alkoxy-aralkyl groups in which the alkyl group has from 1 to 12 carbon atoms and the aryl group is phenyl and B is selected from the group consisting of

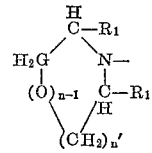

and where $n$ is a whole number from 1 to 2 and $n'$ is 1 when $n$ is 2 and $n'$ is a whole number from 1 to 3 when $n$ is 1, $R_1$ is an alkyl group having from 1 to 5 carbon atoms and $R_2$ and $R_3$ are aliphatic hydrocarbon groups having from 1 to 12 carbon atoms.

17. A 3-steroid compound as defined in claim 16 in which R' is methyl.
18. A 3-enamine derivative as defined in claim 16 in which A is H.
19. A 3-enamine derivative as defined in claim 16 in which A is OH.
20. A 3-enamine derivative as defined in claim 16 in which A is

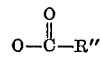

21. A 3-enamine derivative as defined in claim 20 in which R'' is methyl.
22. 3-(N-pyrrolidyl)-6α,16α-dimethyl-3,5-pregnadiene-20-one.
23. 3-(N-pyrrolidyl)-6,16α-dimethyl-17α-hydroxy-3,5-pregnadiene-20-one.
24. 3-(N-pyrrolidyl)-6,16α-dimethyl - 17α-acetoxy-3,5-pregnadiene-20-one.

References Cited in the file of this patent
UNITED STATES PATENTS

| | | |
|---|---|---|
| 2,813,880 | Campbell et al. | Nov. 19, 1957 |
| 3,086,030 | Ringold et al. | Apr. 16, 1963 |